(No Model.)

O. N. RICHARDSON.
COMBINED TONGS, SHOVEL, AND KINDLING SPLITTER.

No. 467,782. Patented Jan. 26, 1892.

Witnesses:
J. B. McGirr.
H. C. Tanner.

Inventor:
Oscar N. Richardson
By Connolly Bros
attys

UNITED STATES PATENT OFFICE.

OSCAR N. RICHARDSON, OF HIGH POINT, NORTH CAROLINA.

COMBINED TONGS, SHOVEL, AND KINDLING-SPLITTER.

SPECIFICATION forming part of Letters Patent No. 467,782, dated January 26, 1892.

Application filed May 29, 1891. Serial No. 394,551. (No model.)

*To all whom it may concern:*

Be it known that I, OSCAR N. RICHARDSON, a citizen of the United States, residing at High Point, in the county of Guilford and State of North Carolina, have invented certain new and useful Improvements in a Combined Tongs, Shovel, and Kindling-Splitter; and I do hereby declare the following to be a full, clear, and exact description of the invention, reference being had to the accompanying drawings, which form part of this specification.

This invention has relation to fire-irons, and has for its object the provision of a novel implement comprising a tongs-shovel capable of conjoint or separate use, as may be required.

In carrying out my invention I provide a pair of tongs that may be used for any of the purposes to which such an instrument is adapted and which consists of a pair of cross-arms or levers pivoted together and formed with loops for the fingers at one end and at the other with flat plates, which serve to grasp the object to be lifted. I also provide a shovel having a slotted lip attached to its rear edge and so arranged in connection with such edge as to form a socket for the reception of the end of one arm of the tongs, which thus serves in lieu of a handle for the shovel and provides an easy and convenient means for handling the same.

Figure 1:
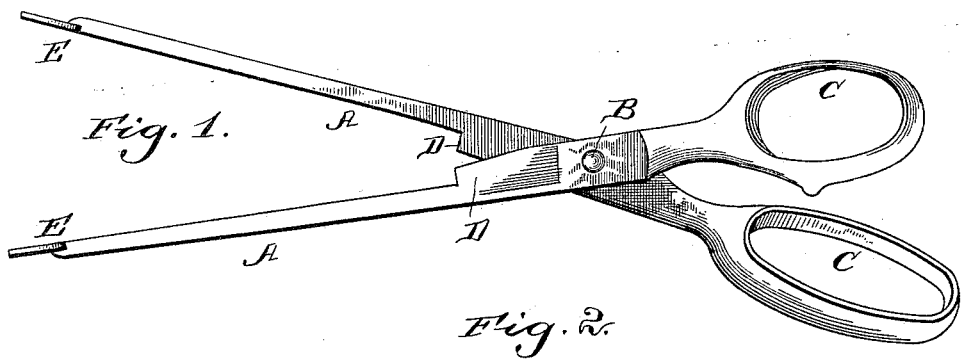
Figure 2:
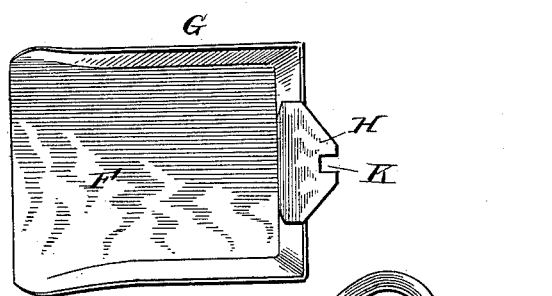

Referring to the accompanying drawings, Figure 1 is a side view of the tongs; Fig. 2, a top view of the shovel; and Fig. 3 a side view of the tongs and shovel fitted together, part of the shovel being in section.

A A designate the cross-arms or levers of the tongs, consisting of flat metallic plates pivotally secured together by a screw B and formed with loops C C for the fingers and thumb and with sharpened crossing edges D D, extending some distance below the screw B, the construction so far as described resembling that of a pair of heavy shears or scissors.

Beyond the crossing edges D D the arms A A are slightly diminished in width and curve toward one another, and the ends of the arms are flattened to form lips E E, which serve to grasp the object which is to be lifted by the tongs.

Figure 3:
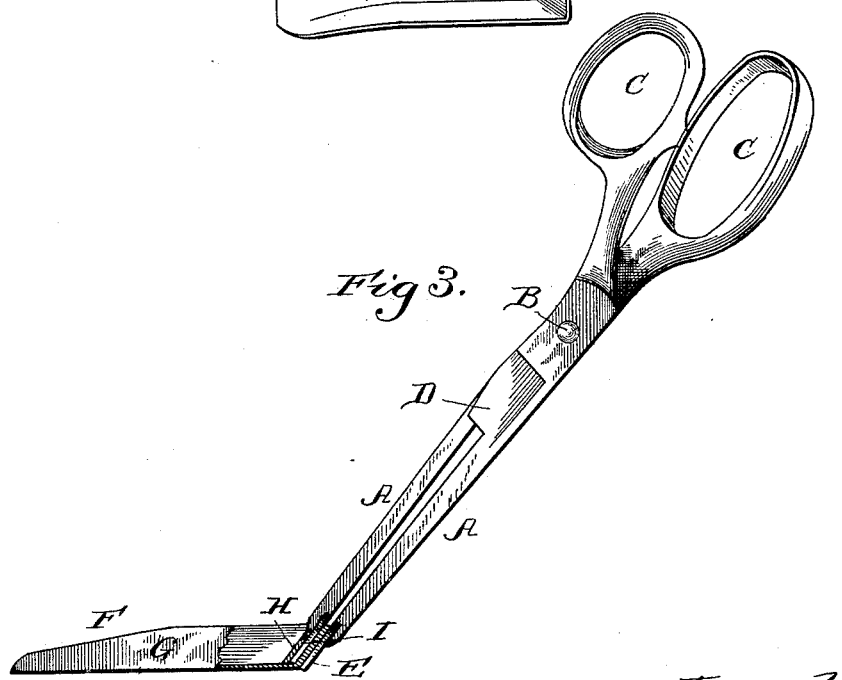

F designates the shovel, which consists of a flat metallic plate of any desired outline and formed with the usual raised edge G around three sides, one of such raised sides forming the rear end of the shovel, to which the handle of the same is ordinarily attached. To this rear edge I attach in lieu of a handle a metallic plate H, having depressed or flanged edges at the point of attachment, so as to form a socket I, which serves to receive the flat plate on the end of either arm of the tongs when the tongs and shovel are fitted together, as shown in Fig. 3. A slot K is cut in the top of plate H and serves to receive the arms of the tongs back of the flat plate on the end of the same and prevents the shovel from moving or slipping laterally when fitted to the tongs.

When the shovel and tongs are fitted together, as shown in Fig. 3, and the tongs are grasped in the hand, the flat plate on the lower cross-arm is brought up against the back of the raised edge of the shovel beneath or back of the socket I and serves, in connection with the flat plate on the other arm of the tongs, to firmly grasp and hold the shovel while it is being used.

Having described my invention, what I claim, and desire to secure by Letters Patent, is—

The combined tongs and shovel consisting of the arms A A, pivoted together and formed each with flat plates E at their ends, in combination with the shovel-blade F, having a flange G, a metallic plate H, attached to said flange and having depressed edges forming a socket I for the reception of the flat plate on one of the arms A, and a slot H to receive the end of said arm, all constructed and arranged substantially as described.

In testimony that I claim the foregoing I have hereunto set my hand this 17th day of April, 1891.

OSCAR N. RICHARDSON.

Witnesses:
A. B. SMITH,
D. A. STANTON.